United States Patent Office 2,840,470
Patented June 24, 1958

2,840,470

METHOD OF PREPARING A FLUORESCENT SCREEN

Albert Kenneth Levine, Jersey City, N. J., assignor to Sylvania Electric Products Inc., a corporation of Massachusetts No Drawing. Original application September 27, 1951, Serial No. 248,661. Divided and this application November 17, 1953, Serial No. 392,753

8 Claims. (Cl. 96—35)

This invention relates to a method of preparing a cathode ray screen. More particularly, it relates to a method suitable for preparing cathode ray screens coated with a plurality of phosphors positioned thereon in a desired pattern.

This application is a division of application Serial Number 248,661 filed September 27, 1951 entitled "Screen for Color Television."

The cathode ray screen of the all-electronic color picture tubes which are at present under consideration consist of a group of symmetrically placed dots or lines of phosphors on a glass screen. One screen-design in particular consists of an array of some 351,000 dots of phosphor on a 9" x 12" screen arranged in clusters of three dots including one each of the primary colors. Each cluster of three dots must be suitably located with respect to a corresponding hole in a thin perforated metal sheet placed a short distance (about 0.8") from the phosphor screen if the cathode ray tube is to give the desired results. Since the placing of these dots of phosphor on the screen in spaced relation with one another and in alignment with the hole in the spaced metal sheet is critical it has been found that methods for applying such phosphor dots to the screen such as printing or silk screening techniques are not normally satisfactory. The problems encountered with silk screening techniques are numerous in that not only is registration a problem but the application of the second and third series of dots leads to variations in dot sizes which are brought about by the increased spacing between the printing mask and plate caused by the presence of the first series of dots on the glass screen. When printing techniques are used it is most difficult to obtain the needed degree of accuracy of registration. In fact, all of the methods which have heretofore been tried for making these tri-color screens have only been suited for hand operation where a small number of screens were needed but not for any method which might be considered commercially economical.

It is an object of this invention to provide a commercially economical method of making a screen in which the phosphor is laid down in a particular, predetermined design.

It is a further object of this invention to provide a method for making screens having a plurality of phosphors by a method which is adapted for commercial production.

It is a still further object of this invention to provide a simple method of making a tri-color screen in which the various phosphors will be accurately spaced with respect to one another.

In accordance with this invention, these objects and other advantages are achieved with the use of a technique employing a light-sensitive polymer material (natural or synthetic) which is directly applied to the screen.

In accordance with the preferred method of this invention, for example, a photo-sensitive film forming material is thoroughly mixed with a quantity of fine phosphor powder to which a sensitizing material may be added if necessary. This material is then used to coat a clean glass panel with the phosphor containing photosensitive film. The film is then dried and exposed to light preferably through the aperture plate which is to go into the finished color tube. However, a photographic plate having the proper arrangement of transparent holes may be used in place of the aperture plate.

After the exposure to light has been completed the exposed plate is washed with a solvent for the photosensitive film. This will leave an array of dots consisting of phosphor incorporated in the light-fixed photosensitive material remaining on the glass panel. This is then allowed to dry whereupon the glass panel is coated with another layer of photosensitive material into which has been incorporated a second phosphor which will emit a different color under cathode ray bombardment. After drying the second layer the aperture plate or the photographic plate is registered with respect to the existing sets of dots whereupon the plate is again exposed to light, washed and dried. This procedure will have deposited the second set of dots on the plate. To obtain the third set of dots it is only necessary to repeat the procedure using a photosensitive film forming material into which has been incorporated a third phosphor material, re-registering the aperture plate or photographic plate, exposing the coating to light, washing and drying the plate. This will leave a three dot array on the glass panel which can then be baked to gasify and drive off the volatile ingredients and leave the phosphor on the plate in the desired design pattern. It is of course understood that this method is adaptable for the production of screens having a phosphor pattern of any design.

In another modification of this invention in which photosensitive film is used for the making of the tri-color screen, a photosensitive film forming material of a light hardenable photo resist is used to place a coating on the dry glass on which the screen is to be formed and with this particular modification no phosphor is included in the film. After this film has been dried it is subjected to light through a plate which transmits light to all portions of the film other than those at which it is finally desired to have the phosphor present on the glass. The exposed plate is then washed to remove the film of photo resist from those areas which have not been subjected to light. In the case of a dot pattern this leaves a light hardened film on the glass having a series of holes at those place where the dots of phosphor are to remain. After the light hardened film of photo resist has been dried the holes are filled with an adhesive, for example, ethyl silicate, and a powdered phosphor of a desired color is either brushed or settled thereon. Alternatively, the phosphor may be incorporated into the adhesive and the holes filled with this mixture. Thereupon, the remaining film is removed by a suitable method such as immersing in hot 3% hydrogen peroxide or in an enzyme solution leaving behind the phosphor dot pattern on the glass. The panel is again dried and coated with a sensitized photosensitive film. This film is again covered with a photographic plate containing a pattern of black dots which have been properly oriented with respect to the first series of dots whereupon the film is exposed to a suitable light source, washed to remove the unexposed film leaving a second series of holes which are again filled with adhesive and brushed with a second phosphor (or with adhesive into which is incorporated phosphor) whereupon the remaining film is again removed with a solvent leaving the two sets of phosphors behind. The process is again repeated to place the third set of dots on the glass panel.

There are quite a number of photosensitive film materials which are available and adaptable for use in accordance with this invention. The most common ones are, for example, polyvinyl alcohol, polyvinyl acetate, gelatin, glue, shellac and photosensitive materials of the type produced by the photographic material manufacturers. Some of these materials required the addition of a sensitizing material which is usually an oxidizing material, the most common of which is a bichromate salt such as is used in the silk screening art.

In accordance with a preferred example a photosensitive film for a tri-colored screen can be prepared as follows: 70.8 grams of polyvinyl alcohol whose 4% solution at 20° C. has a viscosity of 20 to 25 centipoises is dispersed in 470 cc. of cold water by means of vigorous agitation. The dispersion is then stirred and warmed to a temperature of 80° C., this temperature being maintained until the dispersion is clear whereupon it is filtered to remove any undispersed particles. To this dispersion is then added 20 grams of finely divided phosphor from which large particles and agglomerates have been removed. This mixture is milled until the phosphor is uniformly dispersed whereupon 30 cc. of 0.4 molar ammonium bichromate is added and the mixture is milled for two minutes. Since this material is light-sensitive, dark room precautions must be observed. The so-obtained preparation is then ready for use in preparing the tri-color screen. This material is coated over a clean dry glass panel. To obtain a uniform screen density (milligrams phosphor per unit area) it is necessary to control the thickness of the film. In the case of flat glass panels this can readily be done by drawing a doctor blade across the film. A good example of thickness of film is about 0.008". The film is then dried in the dark and is ready for exposure. After exposure. through a photographic plate the unexposed portions can be washed off with water. This leaves an array of dots. The plate is then dried and given another coating with the photosensitive phosphor containing film and exposed and washed to give a second set of dots. The procedure of coating, exposing and washing is repeated until the desired tri-dot pattern is obtained, after which the glass panel is baked in a furnace at a temperature ranging between 400 and 500° C. This results in the gasifying or volatilization of the photo-sensitive material and leaves only the phosphor in the desired pattern, the phosphor being held in place by surface forces.

The screen so produced may be coated if desired with a protective coating such as ethyl silicate, potassium silicate, sodium silicate, silicon or silicone.

What is claimed is:

1. The method of preparing a tri-color fluorescent screen including the steps of coating a screen surface with a first light hardenable and heat gasifiable film of a photo-sensitive organic colloid, exposing designated areas of said first film to light through a mask to harden said designated areas, removing unexposed areas of said first film to leave depressions at locations corresponding to said unexposed areas, filling said depressions with a first phosphor and adhering said first phosphor to said screen surface, removing the exposed and light hardened areas of said first film, coating said screen surface with a second light hardenable and heat gasifiable film of a photo-sensitive organic colloid, exposing previously unexposed designated areas of said second film to light through a mask to harden said designated areas, removing unexposed areas to leave depressions at locations corresponding to said unexposed areas, filling said depressions with a second phosphor and adhering said second phosphor to said screen surface, removing the exposed and light hardened areas of said second film, coating said screen surface with a third light hardenable and heat gasifiable film of a photo-sensitive organic colloid, exposing previously unexposed designated areas of said third film to light through a mask to harden said designated areas, removing unexposed areas to leave depressions at locations corresponding to said unexposed areas, filling said depressions with a third phosphor and adhering said third phosphor to said screen surface, and baking said screen to gasify remaining portions of said light hardened films leaving behind said first, second, and third phosphors on said screen surface.

2. The method of preparing a tri-color fluorescent screen including the steps of coating a screen surface with a first light hardenable film of photo-sensitive material, exposing designated areas of said first film to light through a mask, washing said film with a solvent to remove unexposed areas of said first film and to leave depressions at locations corresponding to said unexposed areas, filling said depressions with a first phosphor and adhering said first phosphor to said screen surface, removing the exposed and light hardened areas of said first film, coating said screen surface with a second light hardenable film of photo-sensitive material, exposing previously unexposed designated areas of said second film to light through a mask, washing said second film with a solvent to remove unexposed areas and to leave depressions at locations corresponding to said unexposed areas, filling said depressions with a second phosphor and adhering said second phosphor to said screen surface, removing the exposed and light hardened areas of said second film, coating said screen surface with a third light hardenable film of photo-sensitive material, exposing previously unexposed designated areas of said third film to light through a mask, washing said third film with a solvent to remove unexposed areas and to leave depressions at locations corresponding to said unexposed areas, filling said depressions with a third phosphor and adhering said third phosphor to said screen surface, and baking said screen to gasify remaining portions of said light hardened films leaving behind said first, second, and third phosphors on said screen surface.

3. The method of preparing a tri-color fluorescent screen including the steps of coating a screen surface with a first light hardenable film of photo-sensitive material, exposing designated areas of said first film to light through a mask, washing said film with a solvent to remove unexposed areas of said first film and to leave depressions at locations corresponding to said unexposed areas, filling said depressions with a first phosphor and adhering said first phosphor to said screen surface, removing the exposed and light hardened areas of said first film, coating said screen surface with a second light hardenable film of photo-sensitive material, indexing said mask and exposing previously unexposed designated areas of said second film to light through said mask, washing said second film with a solvent to remove unexposed areas and to leave depressions at locations corresponding to said unexposed areas, filling said depressions wtih a second phosphor and adhering said second phosphor to said screen surface, removing the exposed and light hardened areas of said second film, coating said screen surface with a third light hardenable film of photosensitive material, indexing said mask and exposing previously unexposed designated areas of said third film to light through said mask, washing said third film with a solvent to remove unexposed areas and to leave depressions at locations corresponding to said unexposed areas, filling said depressions with a third phosphor and adhering said third phosphor to said screen surface, and baking said screen to gasify remaining portions of said light hardenable film leaving behind said first, second, and third phosphors on said screen surface.

4. In the method of preparing a fluorescent screen having a plurality of phosphors applied in a predetermined pattern, the steps comprising coating the surface on which the screen is to be formed with a light hardenable film of a photo-resist, exposing designated areas of said film to a light source through a negative which permits light to strike said film in a predetermined pattern to harden said film in the exposed areas, washing the film-coated surface to remove the photo-resist from the unexposed areas of said film and to leave depressions of a predetermined design and pattern, filling said depressions with an adhesive, applying a first phosphor to said surface, removing the remaining exposed areas of said film from said surface leaving behind a first phosphor pattern, recoating the entire surface with a light hardenable film of a photo-resist, exposing previously unexposed designated areas of said film to a light source through a negative which permits light to strike said film in a predetermined pattern to harden said film in the exposed areas, washing the film-coated surface to remove the photo-resist from the unexposed areas of said film and to leave depressions of a predetermined design and pattern, filling said depressions with an adhesive, applying a second phosphor to said surface, removing the remaining exposed areas of said film to leave a second phosphor pattern and repeating the above steps of applying a light hardenable film of a photo-resist, exposing previously unexposed designated areas to light through a negative, washing to remove the unexposed film, filling the depression with adhesive, and applying a further phosphor until the desired multiple pattern screen has been produced.

5. In the method of preparing a fluorescent screen having a plurality of phosphors applied in a predetermined pattern, the steps comprising coating the surface on which the screen is to be formed with a light hardenable, water-dispersible film of a photo-resist, exposing designated areas of said film to a light source through a negative which permits light to strike said film in a predetermined pattern to harden said film in the exposed areas, washing the film-coated surface with a stream of warm water to remove the photo-resist from the unexposed areas of said film and to leave depressions of a predetermined design and pattern, filling said depressions with an adhesive, applying a first phosphor to said surface, removing the remaining exposed areas of said film from said surface by immersion of said surface in a hot 3% hydrogen peroxide solvent solution leaving behind a first phosphor pattern, recoating the entire surface with a light hardenable, water-dispersible film of a photo-resist, exposing previously unexposed designated areas of said film to a light source through a negative which permits light to strike said film in a predetermined pattern to harden said film in the exposed areas, washing the film-coated surface to remove the photo-resist from the unexposed areas of said film and to leave depressions of a predetermined design and pattern, filling said depressions with an adhesive, applying a second phosphor to said surface, removing the remaining exposed areas of said film by immersing in said solvent solution to leave a second phosphor pattern and repeating the above steps of applying a film of a photo-resist, exposing previously unexposed designated areas to light through a negative, washing to remove the unexposed film, filling the depression with adhesive, and applying a further phosphor until the desired multiple pattern screen has been produced.

6. In the method of preparing a fluorescent screen having a plurality of phosphors in a predetermined pattern, the steps comprising coating the surface on which the screen is to be formed with a light hardenable film of a photo-resist, exposing designated areas of said film to a light source through a negative which permits light to strike said film in a predetermined pattern to harden said film in the exposed areas, washing the film-coated surface to remove the photo-resist from the unexposed areas of said film and to leave depressions of a predetermined design and pattern, filling said depressions with an adhesive, applying a first phosphor to said surface, removing the remaining exposed areas of said film from said surface in an enzyme solution leaving behind a first phosphor pattern, recoating the entire surface with a light hardenable film of a photo-resist, exposing previously unexposed designated areas of said film to a light source through a negative which permits light to strike said film in a predetermined pattern to harden said film in the exposed areas, washing the film-coated surface to remove the photo-resist from the unexposed areas of said film and to leave depressions of a predetermined design and pattern, filling said depressions with an adhesive, applying a second phosphor to said surface, removing the remaining exposed areas of said film by immersing in said enzyme solution to leave a second phosphor pattern and repeating the above steps of applying a film of a photo-resist, exposing previously unexposed designated areas to light through a negative, washing to remove the unexposed film, filling the depression with adhesive, and applying a further phosphor until the desired multiple pattern screen has been produced.

7. In the method of preparing a fluorescent screen having a plurality of phosphors applied in a predetermined pattern, the steps comprising coating the surface on which the screen is to be formed with a light hardenable film of a photo-resist, exposing designated areas of said film to a light source through a negative which permits light to strike said film in a predetermined pattern to harden said film in the exposed areas, washing the film-coated surface to remove the photo-resist from the unexposed areas of said film and to leave depressions of a predetermined design and pattern, filling said depressions with an adhesive-phosphor mixture, removing the remaining exposed areas of said film from said surface leaving behind a first phosphor pattern, recoating the entire surface with a light hardenable film of a photo-resist, exposing previously unexposed designated areas of said film to a light source through a negative which permits light to strike said film in a predetermined pattern to harden said film in the exposed areas, washing the film-coated surface to remove the photo-resist from the unexposed areas of said film and to leave depressions of a predetermined design and pattern, filling said depressions with an adhesive-phosphor mixture, removing the remaining exposed areas of said film to leave a second phosphor pattern and repeating the above steps of applying a light hardenable film of a photo-resist, exposing previously unexposed designated areas to light through a negative, washing to remove the unexposed film, and filling the depression with adhesive-phosphor mixture until the desired multiple pattern screen has been produced.

8. In the method of preparing a fluorescent screen having a plurality of phosphors applied in a predetermined pattern, the steps comprising coating the surface on which the screen is to be formed with a light hardenable film of a photo-resist, exposing designated areas of said film to a light source through a negative which permits light to strike said film in a predetermined pattern to harden said film in the exposed areas, washing the film-coated surface to remove the photo-resist from the unexposed areas of said film and to leave depressions of a predetermined design and pattern, filling said depressions with an ethyl silicate adhesive, applying a first phosphor to said surface, removing the remaining exposed areas of said film from said surface leaving behind a first phosphor pattern, recoating the entire surface with a light hardenable film of a photo-resist, exposing previously unexposed designated areas of said film to a light source through a negative which permits light to strike said film in a predetermined pattern to harden said film in the exposed areas, washing the film-coated surface to remove the photo-resist from the unexposed areas of said film and to leave depressions of a predetermined design and pattern, filling said depressions with an ethyl silicate adhesive, applying a second phosphor to said surface, removing the remaining exposed areas of said film to leave a second phosphor pattern and repeating the above steps of applying a light hardenable film of a photo-resist, exposing previously unexposed designated areas to light through a negative, washing to remove the unexposed film, filling the depression with adhesive, and applying a further phosphor until the desired multiple pattern screen has been produced.

References Cited in the file of this patent

UNITED STATES PATENTS

| | | |
|---|---|---|
| 1,118,479 | Dodge | Nov. 24, 1914 |
| 2,459,129 | Gresham et al. | Jan. 11, 1949 |
| 2,533,454 | Gresham | Dec. 12, 1950 |
| 2,544,905 | Van Deusen | Mar. 13, 1951 |
| 2,568,448 | Hansen | Sept. 18, 1951 |
| 2,683,769 | Banning | July 13, 1954 |